March 5, 1968
R. J. CONWAY
3,371,784
APPARATUS FOR GRAVITY SEPARATION OF MATERIALS
Filed Oct. 21, 1966
2 Sheets-Sheet 1
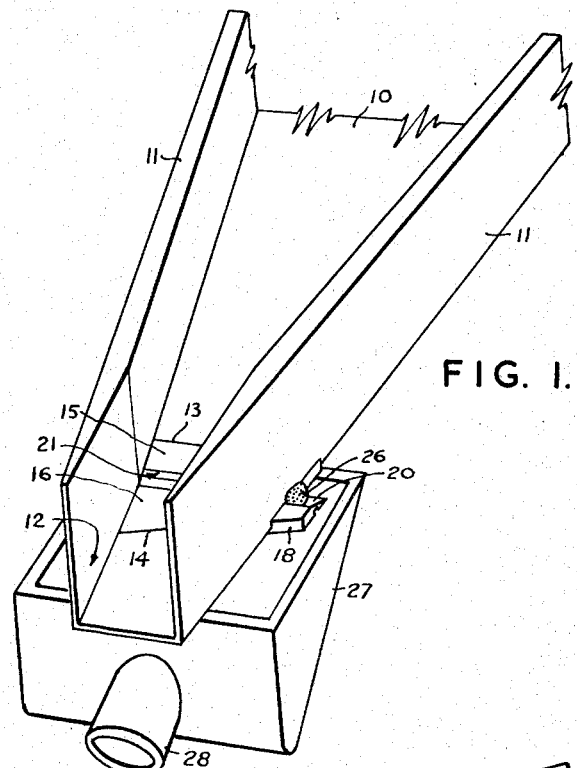
FIG. 1.
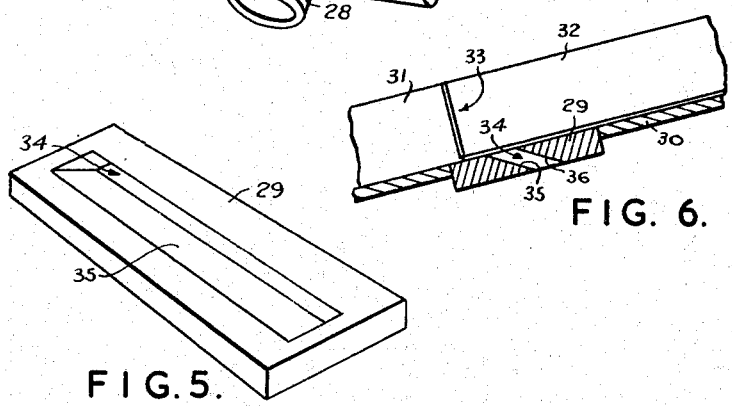
FIG. 5.
FIG. 6.

United States Patent Office 3,371,784
Patented Mar. 5, 1968

---

3,371,784
APPARATUS FOR GRAVITY SEPARATION OF MATERIALS
Richard John Conway, Kingscliff, New South Wales, Australia, assignor to John A. Foyster, Olga M. Foyster, Clive J. Foyster, Lloyd Foyster and Mark Foyster, all of Kingscliff, New South Wales, Australia
Filed Oct. 21, 1966, Ser. No. 588,435
Claims priority, application Australia, Oct. 27, 1965, 65,834/65
5 Claims. (Cl. 209—458)

ABSTRACT OF THE DISCLOSURE

Gravity separation apparatus having a sluice unit with a base sloping downwardly from rear to front and wherein two outlet members are supported in an opening in the base to define a downwardly and rearwardly extending slot through which a lower stratum may pass, one of the outlet members being fixed, the other slidable along an inclined face of the base whereby the size of the slot can be varied.

---

Figure 2:
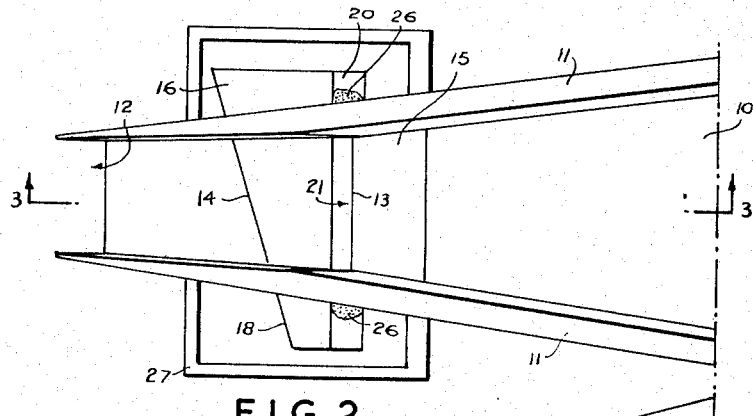

This invention relates to improvements in apparatus for gravity separation of materials.

Gravity separation of materials is useable in many applications, including the separation of fine particles of grains of minerals from silicon sand, the separation of foreign matter from coal in coal washing procedures, the separation of silt from water, and so on. To consider, as an example, the separation of mineral sands, it is usual for a head feed of pulp, which is a mixture of water with sand from which a fairly small included proportion of mineral sand is to be extracted, to be fed to an upgrader, the purpose of which is to separate from the main body of silicon sand, a concentrate very rich in mineral sands, and which is subsequently conveyed to a plant for further concentration and separation of its various components. In certain circumstances, it may be found desirable, in the absence of copious supplies of water, for dry separation to be used to produce a concentrate; and dry separation is also used in subsequent treatment of concentrates.

Various types of upgraders and gravity separators have been proposed, and it is common for the bulk material be caused to flow through a sluice which has an opening, or a series of openings, each such opening being substantially transverse to the direction of flow, and undercut in such a way that its far edge is of knife-like form serving, in effect, to slice the mineral-rich bottom layer from the material, which in flowing through the sluice tends to stratify, with the denser mineral sands, at the bottom, the less dense silica sands at the top.

Now, the material being separated usually includes a quantity of foreign matter, such as particles of grass, roots leaves and other vegetable matter, despite cleaning processes which are normally carried out before the upgrading.

It is found that the sluice openings referred to are likely to become partly clogged in time by the foreign matter, in particular, in the material being processed, the particles of vegetable matter or the like bridging the openings, and causing a build-up around them of sand and other material, so that the separator fails to function properly unless given a good deal of maintenance. This maintenance may interfere with the continuous operation of the upgrader and result in considerable economic losses.

In general, the object of the present invention is to provide gravity separation apparatus which will not be liable to blockages as described, but which will be particularly efficient and trouble-free in operation.

A further object attainable in a preferred embodiment of the invention is to provide such gravity separation apparatus wherein the width of the slot-like opening may be readily adjusted as from time to time required.

Accordingly, the invention resides broadly in gravity separation apparatus of the type having a forwardly and downwardly inclined sluice unit through which material including material to be separated may be caused to flow to result in the material to be separated forming a lower stratum, and an outlet opening substantially transverse to the flow, from rear to front of the material, and through which the said lower stratum may pass; characterized in that the face defining the front of the opening inclines downwardly towards the rear. Other features of the invention will become apparent from the following description.

Figure 3:
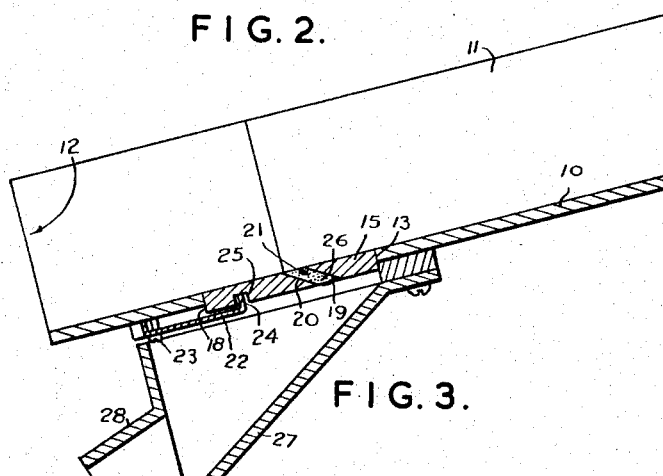
Figure 4:
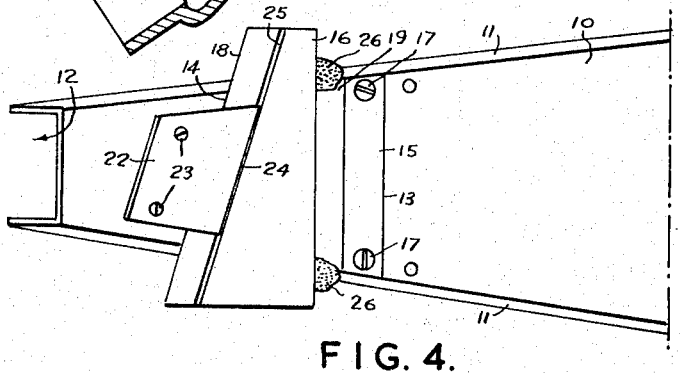

In order that a preferred embodiment of the invention may be readily understood and carried into practical effect, reference is now made to the accompanying drawings, wherein:

FIG. 1 is a perspective view of part of a sluice unit of an upgrader for mineral sand separation, made according to the invention, FIG. 2 is a plan view of the apparatus shown in FIG. 1, FIG. 3 is a sectional view along line 3—3 in FIG. 2, FIG. 4 is an inverse plan view of the apparatus shown in the preceding figures, but with the mineral collecting box removed, FIG. 5 is a perspective view of a sluice outlet unit according to an alternative embodiment of the invention, and FIG. 6 is a longitudinal sectional view of part of a sluice incorporating the outlet unit shown in FIG. 5.

Referring initially to FIGS. 1 to 4 inclusive of the drawings, the apparatus is a secondary sluice of an upgrader for mineral sand separation, the upgrader consisting of a number of similar parallel primary upgrader trays (not shown) arranged one above the other, the assembly being tilted so the bottom of each tray inclines downwardly towards the front and each tray bottom is common to a series of sluices each with side walls which are forwardly convergent to a restricted front passage, the front passage of one leading into the rear of the next, a transverse outlet opening being provided in the bottom at each restricted front passage. Pulp fed to the rear of each of the upgrader trays flows through the series of sluices of that unit, in each sluice undergoing a primary upgrading, the mineral-rich lower stratum of the pulp passing through the outlet opening of the primary sluice and entering the rear part of a secondary sluice. Consequently, with each primary upgrader tray there are associated a number of secondary upgrader sluices as shown in FIGS. 1 to 4 of the drawings, each receiving plup from one outlet of the primary upgrader tray.

The secondary sluice illustrated has a forwardly and downwardly inclined bottom 10 on which are mounted a pair of forwardly convergent side walls 11, of which the front parts of the inner faces are bevelled to reduce somewhat their angle of convergence to a restricted front passage 12.

The sluice bottom 10 is not continuous, a part being omitted to leave, near the front of the sluice, an opening of which the rear edge 13 is transverse to the sluice, the front edge 14 being at an angle to the rear edge. In this opening there are fitted a rear outlet unit 15 and a front outlet unit 16, both with their upper faces co-planar with the upper surface of the sluice bottom 10. The rear outlet unit is secured by screws 17 to close the rear part of the opening in the sluice bottom, the front outlet unit is laterally slidable, its front face 18 being at an angle to its rear and abutting against the oblique front edge 14 of the opening in the sluice bottom. The rear face 19 of the rear outlet unit 15 is parallel to the front face 20 of the front outlet unit 16, both inclining downwardly towards the rear, and as the front outlet unit 16 is moved laterally in one direction or the other, its front face 20 is moved in parallelism nearer to or further from the fixed rear face 19 of the rear outlet unit 15, to narrow or widen the downwardly and rearwardly inclined outlet opening 21 between them. To guide the front outlet unit 16 in its transverse movement and return it in place, a guide bracket 22 is secured by screws 23 under the front part of the sluice bottom 10 and has a flange 24 engaging in a groove 25 formed in the underside of the movable front outlet unit 16 and parallel to the oblique face 20 thereof.

To close the sides of the outlet opening 21, two pieces 26 of a resilient compressible material, such as sponge plastic, are cemented to the sides of the rear outlet unit 15 and bear against the inclined face 20 of the front outlet unit 16.

The outlet opening 21 leads into a mineral collecting box 27, which may be of moulded plastic, and which is secured under the front part of the sluice. The bottom of the box slopes downwardly to the front from which leads a conduit 28.

As the pulp flows over the sluice bottom 10, it tends to stratify, this being assisted preferably by a layer of sand adhesively secured to the sluice bottom. The flow of the pulp is constricted by the convergence of the sluice side walls 11, so that the bottom stratum, rich in mineral sand, is deepened towards the front of the sluice. This relatively dense and slow moving stratum passes through the outlet opening 21, the less dense and more rapidly moving strata of silicon sand, together with foreign vegetable matter, flow over the outlet opening 21 and, as tailings, are discharged through the front sluice passage 12.

The concentrate passing through the outlet opening 21 is caused to flow rearwardly and downwardly into the mineral collecting box 27 and thence, through the conduit 28 to any means for collecting the concentrate from the upgrader.

The outlet 21 may be widened or narrowed as may from time to time be required to achieve the desired concentration of minerals simply by moving the front opening unit 16 to one side or the other manually; though mechanical means may be provided for this purpose if desired.

It will be found that the rearwardly and downwardly inclined outlet opening 21 will efficiently separate denser strata from the pulp flowing through the sluice and at the same time the inclination of the front face 20 of the outlet will tend to cause less dense strata and vegetable and other foreign matter to flow past the slot, which consequently will not be likely to become clogged and rendered ineffective even when the outlet is reduced to a very small width.

FIGS. 5 and 6, to which reference is now made, show a non-adjustable outlet unit 29 which may be used in a primary upgrader tray before refered to, and of which part is shown in FIG. 6, the upgroder tray bottom 30 having fixed tray sides 31 secured thereto. On the tray are a series of sluices each consisting of part of the bottom 30 and a pair of sluice side walls 32 forwardly convergent to a front passage 33. Preferably both side walls 32 are pivoted at their rear ends so that their front parts may be brought closer or further apart, varying the angle of convergence of the side walls and the width of the front passage 33.

The sluice outlet unit 29 is closely fitted and secured in a transverse opening formed in the tray bottom 30 near the front passage 33, the outlet unit being moulded of a suitable plastic material and being a rectangular member, its upper face flush with the upper face of the tray bottom. Through the outlet unit there is formed a slot-like opening 34 of which the front face 35 and the rear face 36 are parallel, both inclining rearwardly and downwardly.

This sluice outlet will be found effective in separating the lower mineral-rich stratum of pulp passing through the sluice, and will not be liable to become clogged with vegetable or other foreign matter, which will flow past the outlet. The outlet opening 34 in the primary upgrader, will not require to be adjusted as to width in the way required for the outlet openings of the secondary upgrader before described.

In both types of outlet openings, as described and illustrated, satisfactory results have been obtained where the front and rear faces of the outlet opening incline rearwardly and downwardly at about the same angle to the horizontal as the sluice bottom inclines forwardly and downwardly; and for wet separation of mineral sands, good results have been achieved when the angle between the front face of the outlet opening and the bottom of the sluice is between 20° and 60°, the rear face of the outlet opening being inclined at a similar angle to the horizontal, but in reverse direction relative to the bottom of the sluice, so that the angle between the sluice bottom and the rear face of the outlet opening may be of the order of 100° to 120°. It is to be understood, of course, that the invention is in no way restricted to angles within these limits, which are given by way of illustrative example only. In other applications of the invention, angles outside these ranges may be found to give optimum results.

I claim:

1. Gravity separation apparatus comprising a sluice unit with a base sloping downwardly from rear to front and through which material including material to be separated may be caused to flow to result in the material to be separated forming a lower stratum, said base having an opening therein, front and back outlet members in the opening in the base, said members being spaced apart and defining a slot extending traversely of the base and through which the said lower stratum may pass; said members having parallel surfaces which define said slot, said surfaces being inclined downwardly and towards the rear of the sluice unit, one of said outlet members being fixed, the other having an inclined face in the plane of the base which is in slidable contact with the base for varying the spacing between said surfaces while maintaining the parallel relation therebetween.

2. Gravity separation apparatus according to claim 1, wherein said surfaces form an angle with the horizontal substantially equal to the angle formed by the base of the sluice unit with the horizontal.

3. Gravity separation apparatus according to claim 1 comprising compressible resilient elements secured to the fixed outlet member for closing the slot at the ends thereof.

4. Gravity separation apparatus according to claim 1, wherein the movable of said outlet members has a lower surface with a groove therein extending parallel to said inclined face, and a guide on the base including a flange engaged in said groove for guiding the movable outlet member in its movement.

5. Gravity separation apparatus according to claim 1, wherein said sluice unit includes lateral walls on the base converging downwardly along the base, said walls having inner facing surfaces which are provided with a bevel in the region of the slot to extend substantially parallel therepast.

References Cited

UNITED STATES PATENTS

| | | | |
|---|---|---|---|
| 757,176 | 4/1904 | Carter | 209—458 X |
| 1,135,754 | 4/1915 | Bell | 209—157 X |
| 1,672,448 | 6/1928 | Clouwez | 209—157 |

FOREIGN PATENTS

| | | |
|---|---|---|
| 231,070 | 1/1960 | Australia. |

HARRY B. THORNTON, *Primary Examiner.*

TIM R. MILES, *Examiner.*